(12) United States Patent
Liu (10) Patent No.: US 7,738,238 B2
(45) Date of Patent: Jun. 15, 2010

(54) PORTABLE AUDIO/VIDEO PLAYING DEVICE DISPOSING STRUCTURE

(76) Inventor: Keng-Yuan Liu, 8F-2, No. 6, Lane 609, Sec. 5, Chongxin Rd., Sanchong City, Taipei County (TW) 241

( * ) Notice: Subject to any disclaimer, the term of this patent is extended or adjusted under 35 U.S.C. 154(b) by 63 days.

(21) Appl. No.: 12/245,190

(22) Filed: Oct. 3, 2008

(65) Prior Publication Data

US 2010/0085702 A1    Apr. 8, 2010

(51) Int. Cl.
*G06F 1/16* (2006.01)
(52) U.S. Cl. ..................... 361/679.01; 341/20
(58) Field of Classification Search ............ 361/679.55, 361/679.01; D14/496; 206/522; 174/50; 386/46; 359/802, 804; 341/20
See application file for complete search history.

(56) References Cited

U.S. PATENT DOCUMENTS

| | | | | | |
|---|---|---|---|---|---|
| 5,058,736 | A * | 10/1991 | Bedol | ......................... | 206/214 |
| 6,049,450 | A * | 4/2000 | Cho et al. | ............... | 361/679.27 |
| 6,672,558 | B2 * | 1/2004 | Li | .............................. | 248/463 |
| 6,961,239 | B2 * | 11/2005 | Schedivy | ............... | 361/679.29 |
| 7,170,427 | B2 * | 1/2007 | Hsu | ............................ | 341/20 |
| 7,230,822 | B2 * | 6/2007 | Langberg et al. | ........ | 361/679.23 |
| D567,818 | S * | 4/2008 | Zhang | ....................... | D14/496 |
| 7,636,235 | B2 * | 12/2009 | Langberg et al. | ........ | 361/679.23 |
| 7,643,283 | B2 * | 1/2010 | Jubelirer et al. | ......... | 361/679.41 |
| 2004/0005138 | A1 * | 1/2004 | Yano et al. | ..................... | 386/46 |
| 2005/0217884 | A1 * | 10/2005 | Yano et al. | .................... | 174/50 |
| 2005/0286858 | A1 * | 12/2005 | Crohas | ........................ | 386/46 |
| 2006/0023412 | A1 * | 2/2006 | Schedivy | .................... | 361/683 |
| 2006/0067044 | A1 * | 3/2006 | Yoshida et al. | .............. | 361/686 |
| 2006/0181840 | A1 * | 8/2006 | Cvetko | ........................ | 361/679 |
| 2007/0247794 | A1 * | 10/2007 | Jaffe et al. | ................... | 361/681 |
| 2008/0278894 | A1 * | 11/2008 | Chen et al. | ................... | 361/681 |
| 2008/0291610 | A1 * | 11/2008 | Rohrbach | .................... | 361/679 |
| 2009/0097192 | A1 * | 4/2009 | Riddiford | .............. | 361/679.01 |

FOREIGN PATENT DOCUMENTS

JP        06020455 A   *   1/1994

* cited by examiner

*Primary Examiner*—Lisa Lea-Edmonds
(74) *Attorney, Agent, or Firm*—WPAT, P.C.; Anthony King (57) ABSTRACT

A portable audio/video device disposing structure includes: a base having a recession disposed on a surface of the base; a carrying unit movably coupled with the recession of the base and having a disposing portion disposed on a surface of the carrying unit, a latch element disposed at an end of the disposing portion, and an indentation disposed on both sides of the disposing portion separately; and a contractible unit with both ends coupled to the base and the carrying unit respectively. The portable audio/video device is installed on the carrying unit in conformity with the base and the contractible unit to achieve the effects of adjusting the portable audio/video device to any angle and disposing the portable audio/video device in any position.

4 Claims, 9 Drawing Sheets

PORTABLE AUDIO/VIDEO PLAYING DEVICE DISPOSING STRUCTURE

FIELD OF THE INVENTION

The present invention relates to a portable audio/video device, and more particularly to a portable audio/video device disposing structure installed on a carrying unit in conformity with a base and a contractible unit to achieve the effects of adjusting the disposing the portable audio/video device at any angle and disposing the portable audio/video device in any position.

BACKGROUND OF THE INVENTION

In general, a portable audio/video device includes a casing, a system processing means, and a storage means, wherein a power supply means, a display screen and a plurality of control keys are coupled to the system processing means separately, and the display screen and the plurality of control keys are installed on a surface of the casing, and thus the audio/video device can be carried easily by users to give an effect of an instant audio/video play.

Although the portable audio/video device emphasizes on the audio/video playing functions, the portability of a light, thin, short and compact device is also very important. Since the portable audio/video device does not come with any support structure, therefore a user has to hold the portable audio/video device to view video contents. Such arrangement not only causes inconvenience to the user's viewing, but also results in pains and uneasiness of the user's hand after holding the portable audio/video device for a long time. Obviously, the aforementioned conventional portable audio/video device is unable to meet the requirements of a practical application.

SUMMARY OF THE INVENTION

Therefore, the primary objective of the present invention is to provide a portable audio/video device installed on a carrying unit in conformity with a base and a contractible unit to achieve the effects of adjusting the angle of the portable audio/video device and disposing of the portable audio/video device in any position.

To achieve the foregoing objective, the present invention provides a portable audio/video device disposing structure, comprising: a base having a recession disposed on a surface of the base; a carrying unit movably coupled with the recession of the base and having a disposing portion disposed on a surface of the carrying unit, a latch element disposed at an end of the disposing portion, and an indentation disposed on both sides of the disposing portion separately; and a contractible unit with both ends coupled to the base and the carrying unit respectively.

DESCRIPTION OF THE PREFERRED EMBODIMENT

Figure 1:
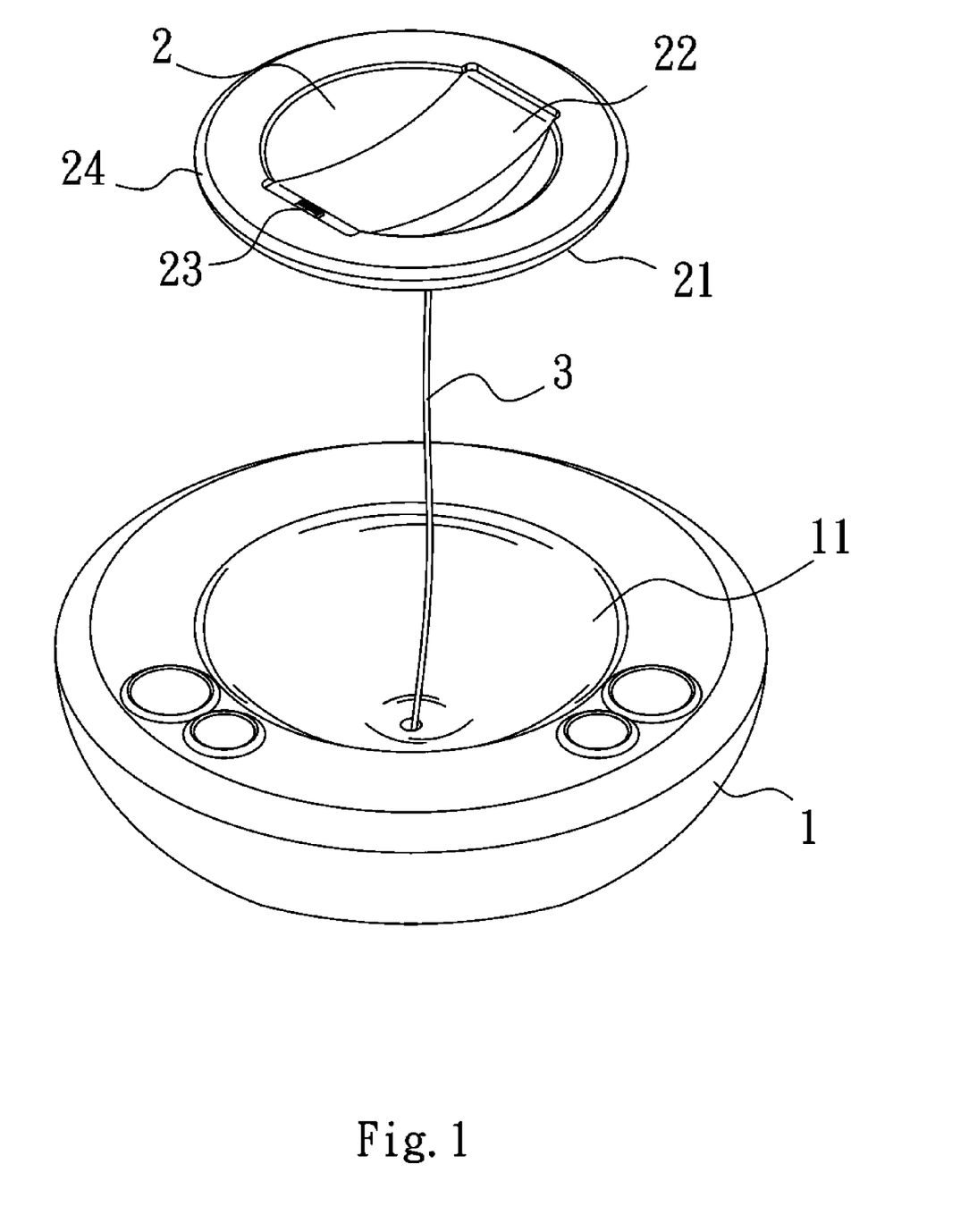
FIG. 1 is an exploded view of a first preferred embodiment of the present invention.
Figure 2:
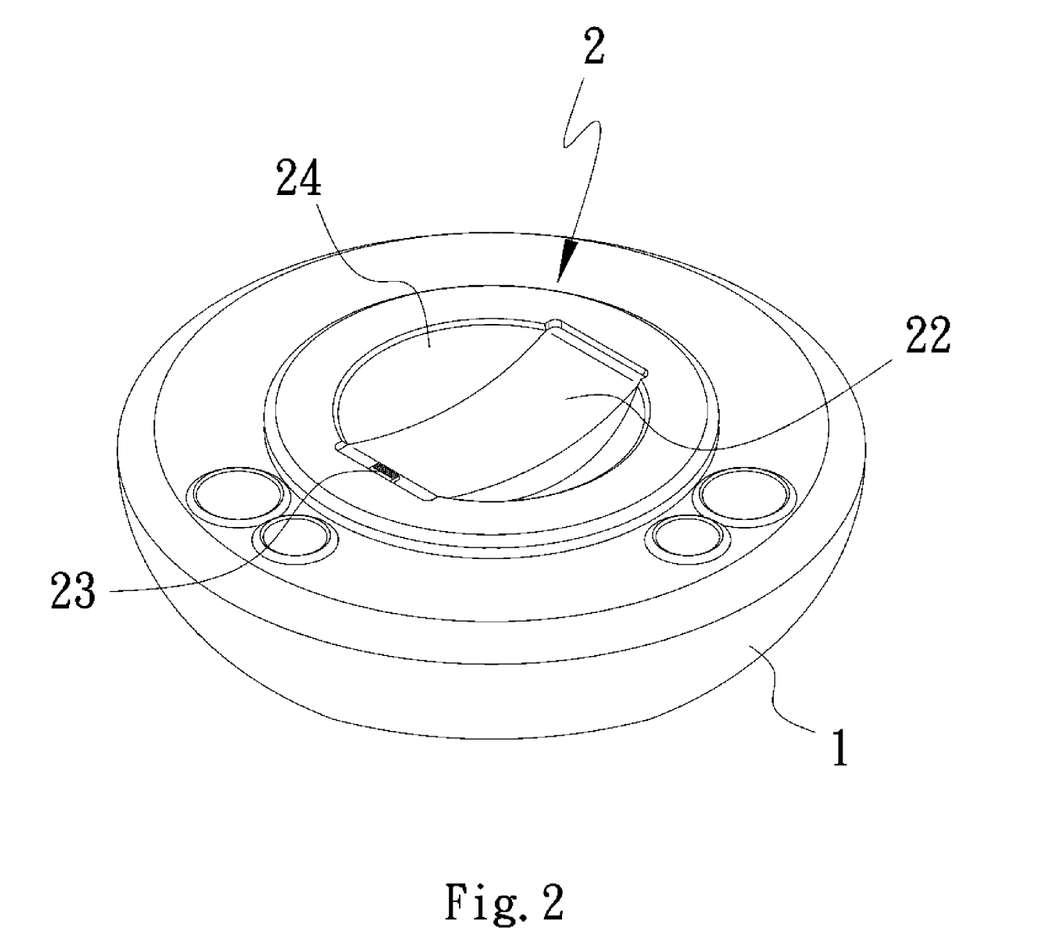
FIG. 2 is a perspective view of a first preferred embodiment of the present invention.

With reference to FIGS. 1 and 2 for an exploded view and a perspective view of a portable audio/video device disposing structure in accordance with a first preferred embodiment of the present invention respectively, the structure comprises a base 1, a carrying unit 2 and a contractible unit 3.

The base 1 has a recession 11 on a surface of the base 1, and the recession 11 is substantially a concave curved surface.

The carrying unit 2 is movably coupled to the recession 11 of the base 1, and has an arc portion 21 disposed at the bottom of the carrying unit 2 and corresponding to the recession 11, a disposing portion 22 disposed on a surface of the carrying unit 2, a latch element 23 disposed at an end of the disposing portion 22, and an indentation 24 disposed on both sides of the disposing portion 22 separately.

Both ends of the contractible unit 3 are coupled to the recession 11 of the base 1 and the arc portion 21 of the carrying unit 2 respectively. The aforementioned elements constitute a novel portable audio/video device disposing structure.

Figure 3:
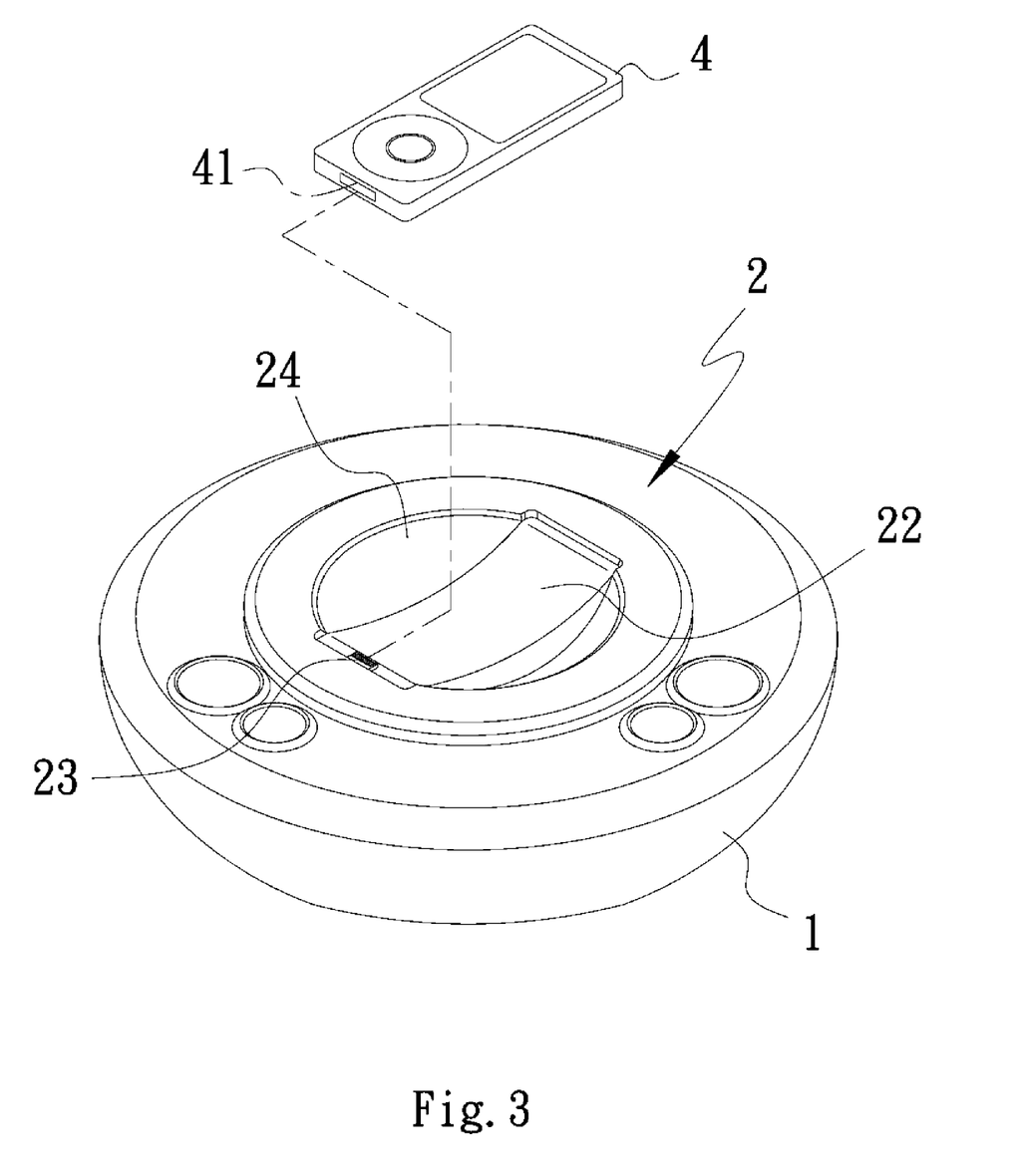
FIG. 3 is a schematic view of an assembling status of a first preferred embodiment of the present invention.
Figure 4:
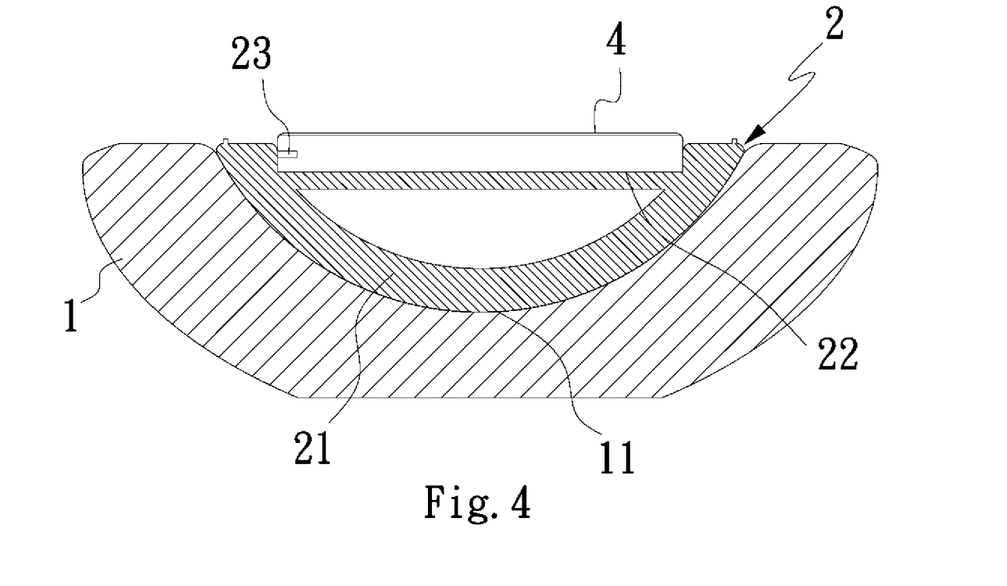
FIG. 4 is a schematic view of an assembled status of a first preferred embodiment of the present invention.
Figure 5:
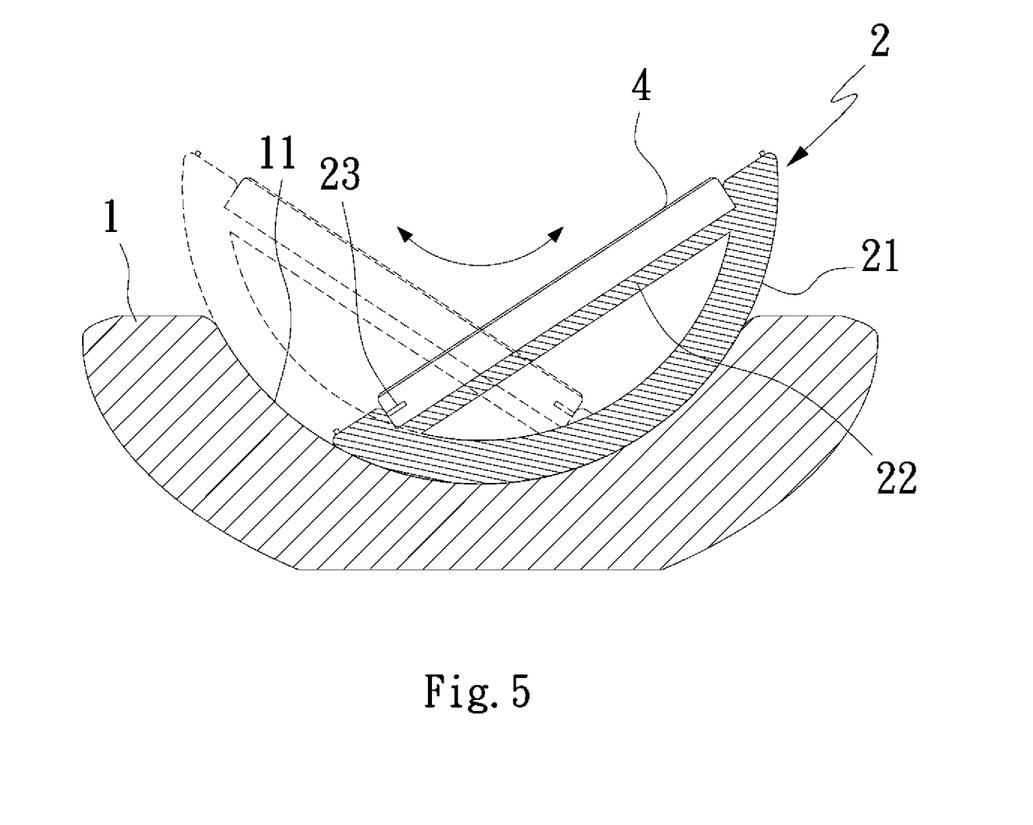
FIG. 5 is a cross-sectional view of an using status of a first preferred embodiment of the present invention.
Figure 6:
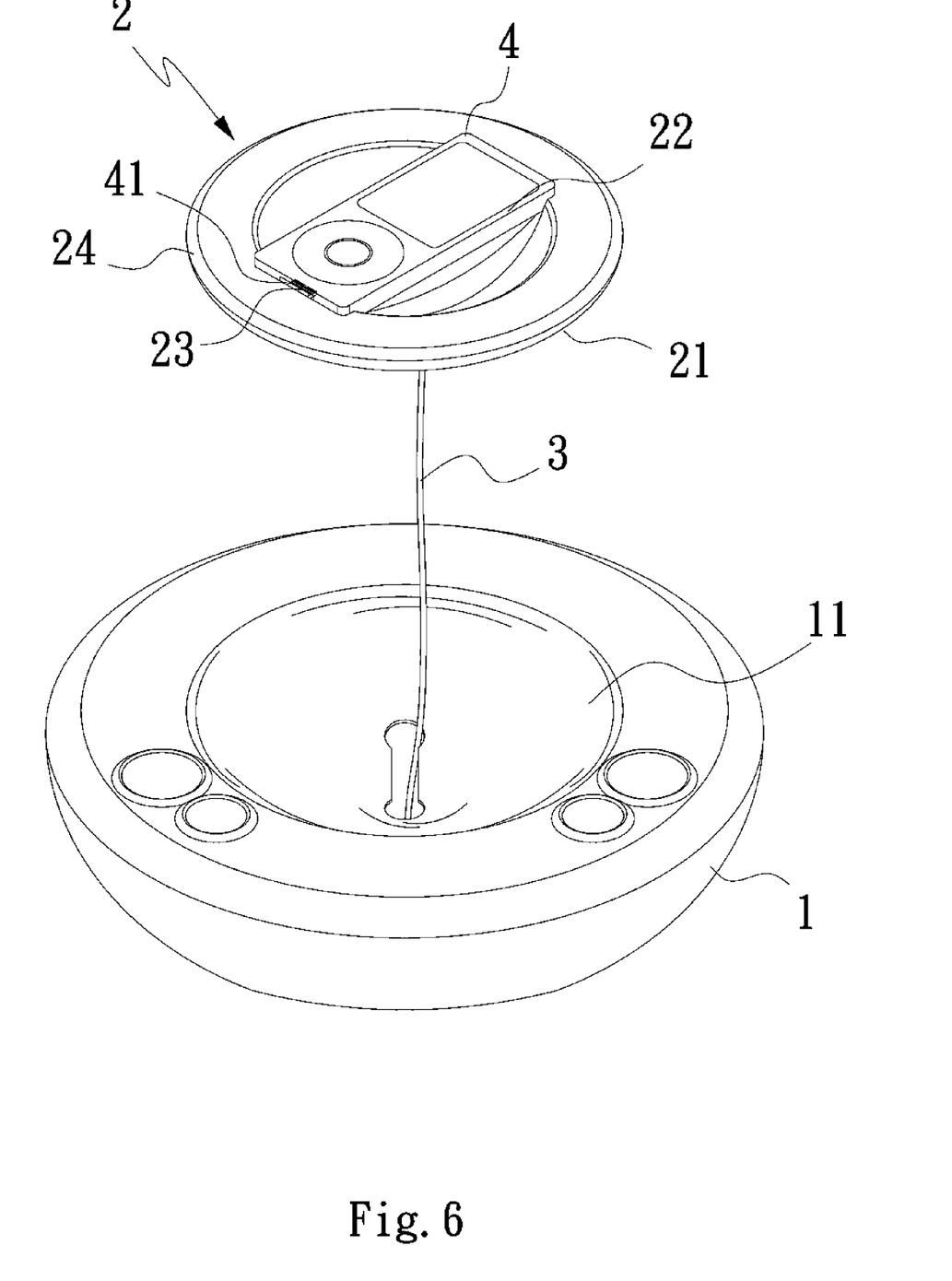
FIG. 6 is an exploded view of a second preferred embodiment of the present invention.
Figure 7:
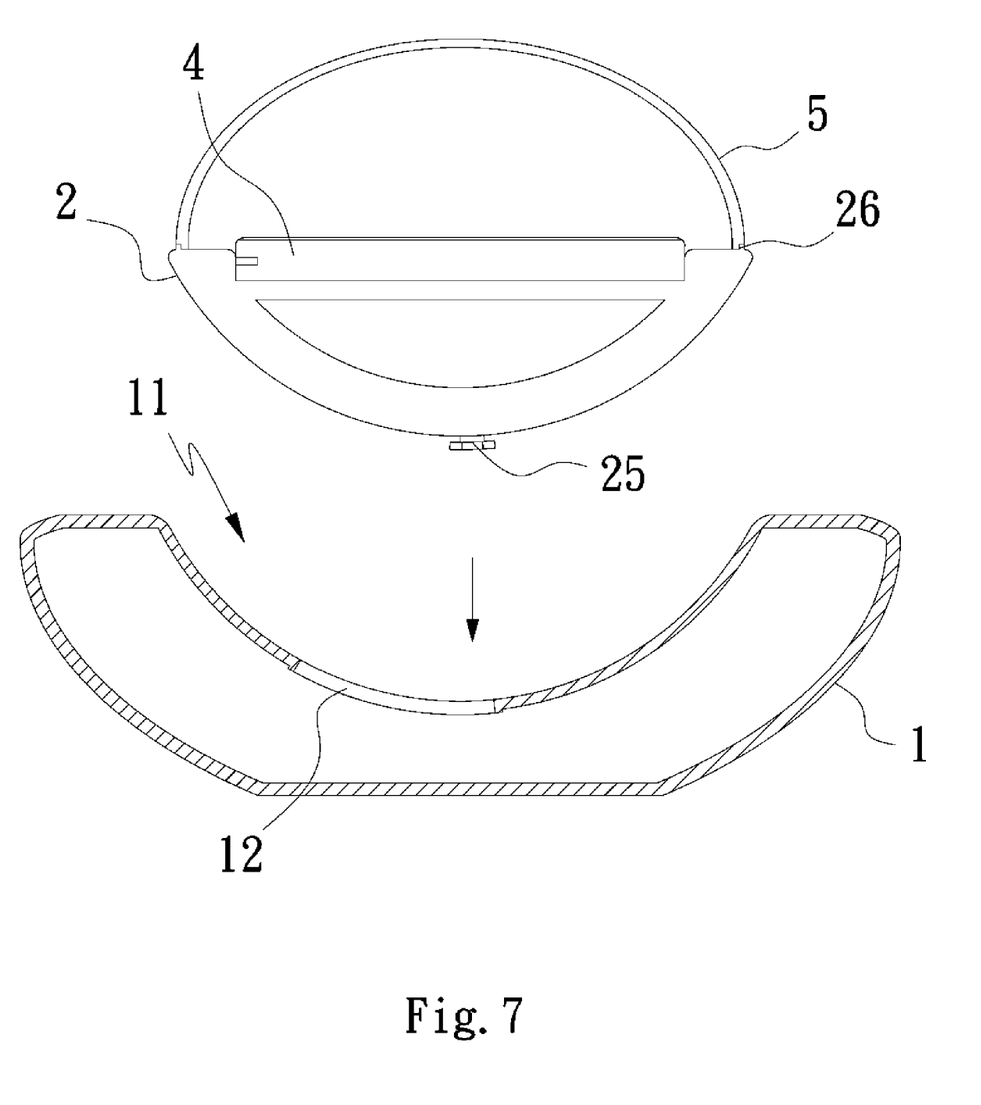
FIG. 7 is a cross-sectional view of a second preferred embodiment of the present invention.
Figure 8:
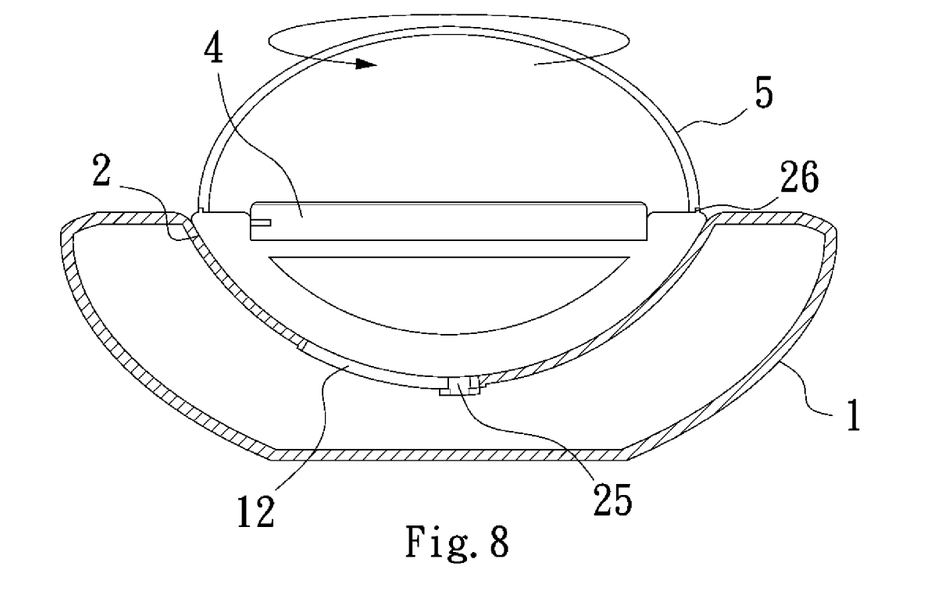
FIGS. 8 to 11 are schematic views of an adjusting status of a second preferred embodiment of the present invention.
Figure 9:
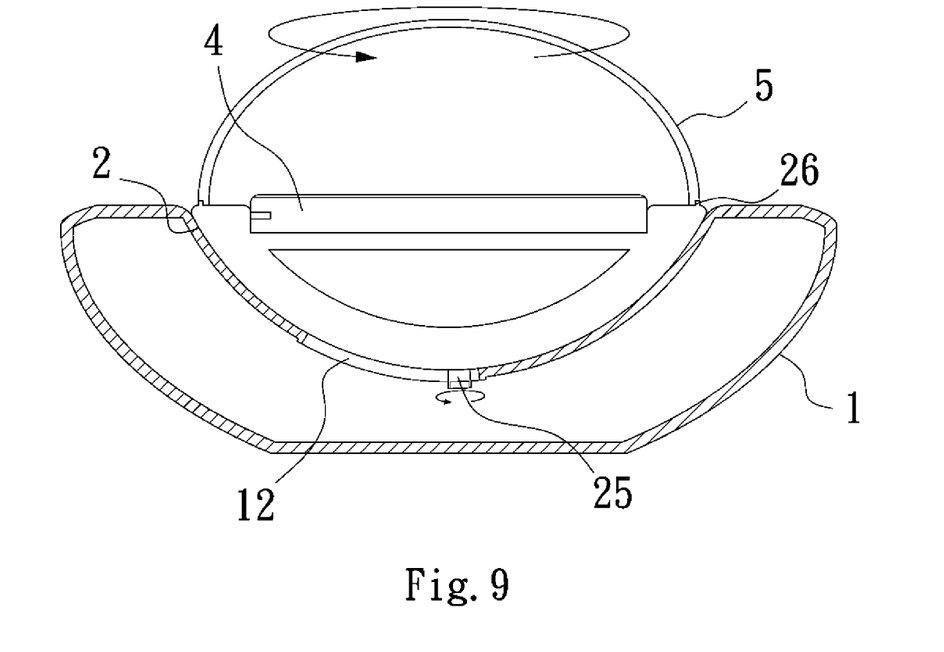
Figure 10:
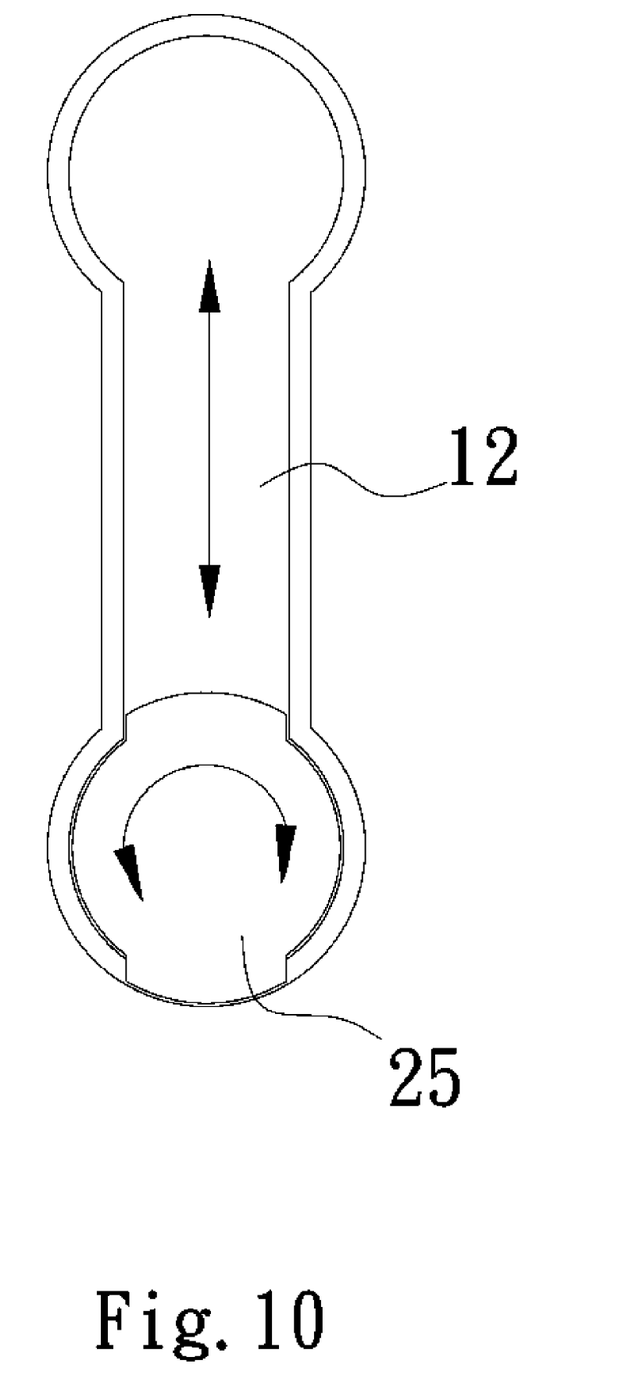
Figure 11:
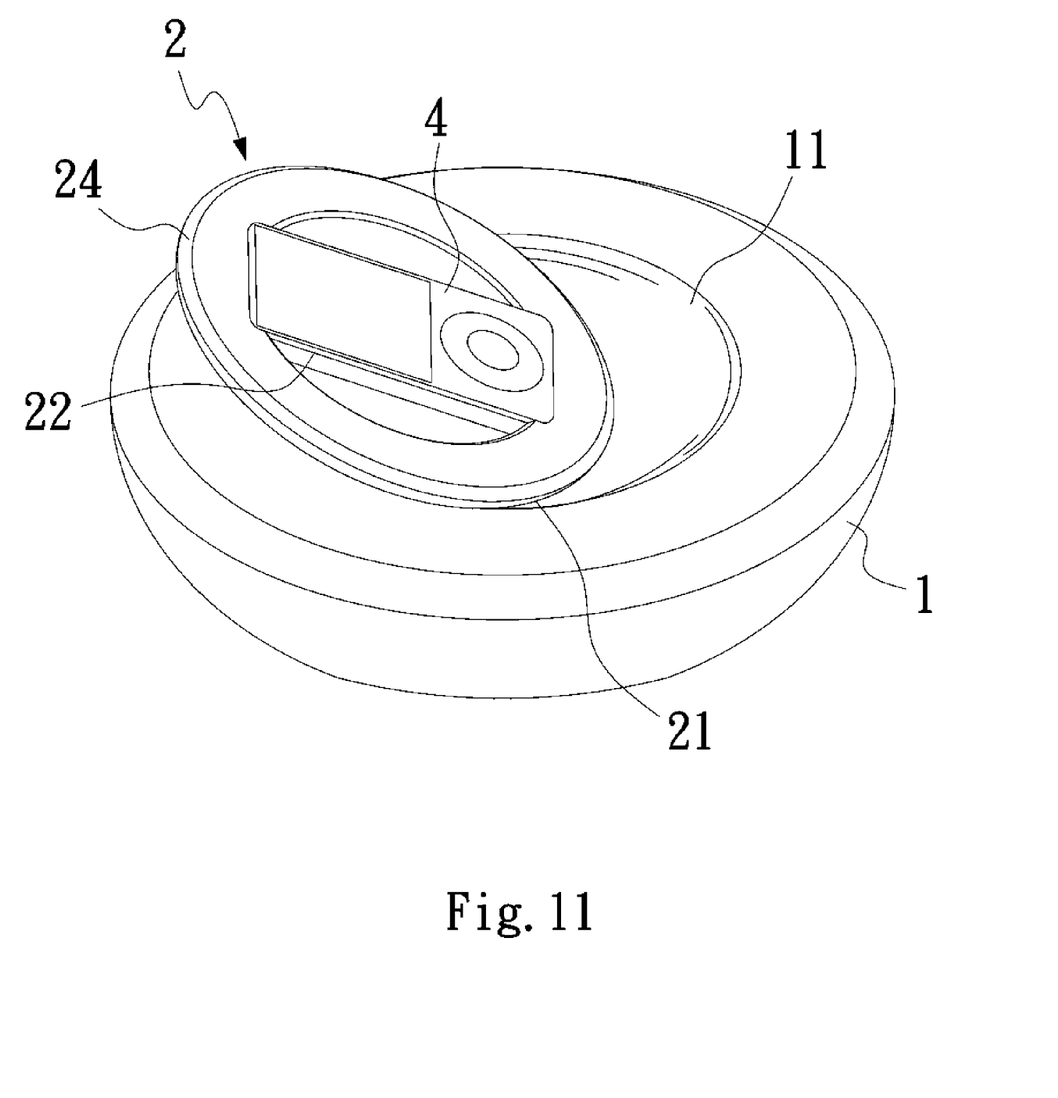

With reference to FIGS. 3 to 5 for a schematic view of an installing status, a schematic view of an installed status and a cross-sectional view of a using status in accordance with a first preferred embodiment of the present invention respectively, a user latches a connecting portion at an end of the portable audio/video device 4 with latch element 23 at an end of the disposing portion 22 for installing the portable audio/video device 4 onto the carrying unit 2, and adjusts the angle of the carrying unit 2 with respect to the base 1. During the angle adjustment, the arc portion 21 at the bottom of the carrying unit 2 is slid on the recession 11 of the base 1 to provide a smooth sliding movement. In the meantime, the contractible unit 3 is contracted to position the carrying unit 2 onto the base 1 after the adjustment is made, so that the portable audio/video device 4 can achieve the effect of adjusting the portable audio/video device 4 to any angle.

In addition, the user holds both sides of the disposing portion 22 through each indentation 24 and then applies an external force upward to remove the carrying unit 2 from the base 1, and pulls the contractible unit 3 to dispose the portable audio/video device 4 in any position.

With reference to FIGS. 6 to 11 for an exploded view, a cross-sectional view, and cross-sectional views in accordance with a second preferred embodiment of the present invention, this embodiment includes the elements of the first preferred embodiment and further includes an embedding hole 12 disposed in the recession 11 of the base 1, a connecting element 25 disposed at the bottom of the carrying unit 2 and movably coupled to the embedding hole 12, a rib 26 disposed around a surface of the carrying unit 2, and a transparent image amplification unit 5 latched to the rib 26.

With the forgoing elements, the connecting element 25 of the carrying unit 2 is movably coupled to the embedding hole 12 of the base 1, such that the carrying unit 2 and the base 1 in conformity with the connecting element 25 and the embedding hole 12 to install the portable audio/video device 4 on the carrying unit 2 for rotating the portable audio/video device 4 base 1 and adjusting the portable audio/video device 4 base 1 to any angle. The invention also achieves the effect of amplifying an image by the image amplification unit when the portable audio/video device 4 is played.

In summation of the description above, the portable audio/video device disposing structure of the invention can overcome the foregoing shortcomings of the prior art effectively, such that the portable audio/video device installed on the carrying unit in conformity with the base and the contractible unit achieves the effects of adjusting the portable audio/video device to any angle and disposing the portable audio/video device in any position. The invention complies with the patent application requirements, and thus is duly filed for patent application.

While the invention has been described by means of specific embodiments, numerous modifications and variations could be made thereto by those skilled in the art without departing from the scope and spirit of the invention set forth in the claims.

What is claimed is:

1. A portable audio/video device disposing structure, comprising:
   a base, having a recession disposed on a surface of the base;
   a carrying unit, movably coupled with the recession of the base, and having a disposing portion disposed on a surface of the carrying unit, a latch element disposed at an end of the disposing portion, and an indentation disposed on both sides of the disposing portion separately; and
   a contractible unit, with both ends coupled to the base and the carrying unit respectively;
   wherein the carrying unit has a rib disposed around a side of the carrying unit and coupled with a transparent image amplification unit.

2. The portable audio/video device disposing structure of claim 1, wherein the recession is substantially a concave curved surface.

3. The portable audio/video device disposing structure of claim 1, wherein the carrying unit has an arc portion disposed at the bottom of the carrying unit.

4. The portable audio/video device disposing structure of claim 1, wherein the recession of the base has an embedding hole, and the carrying unit has a connecting element disposed at the bottom of the carrying unit and movably coupled to the embedding hole.

* * * * *